(12) United States Patent
Yamamoto et al.

(10) Patent No.: US 11,724,480 B2
(45) Date of Patent: *Aug. 15, 2023

(54) INTERLAYER FILM FOR COLORED LAMINATED GLASS, AND COLORED LAMINATED GLASS

(71) Applicant: SEKISUI CHEMICAL CO., LTD., Osaka (JP)

(72) Inventors: Masaki Yamamoto, Shiga (JP); Manabu Matsumoto, Shiga (JP); Hiroaki Inui, Roermond (NL); Atsushi Nohara, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 77 days.

This patent is subject to a terminal disclaimer.

(21) Appl. No.: 17/395,199

(22) Filed: Aug. 5, 2021

(65) Prior Publication Data

US 2021/0362478 A1     Nov. 25, 2021

Related U.S. Application Data

(63) Continuation of application No. 16/316,065, filed as application No. PCT/JP2017/028137 on Aug. 2, 2017, now Pat. No. 11,117,351.

(30) Foreign Application Priority Data

Aug. 3, 2016 (JP) ................................. 2016-153260
Aug. 3, 2016 (JP) ................................. 2016-153261

(51) Int. Cl.
*B32B 17/10* (2006.01)
*B29C 48/00* (2019.01)
(Continued)

(52) U.S. Cl.
CPC ...... *B32B 17/10587* (2013.01); *B29C 48/002* (2019.02); *B29C 48/022* (2019.02);
(Continued)

(58) Field of Classification Search
CPC .......................................... B32B 17/10–10798
See application file for complete search history.

(56) References Cited

U.S. PATENT DOCUMENTS 6,239,211 B1    5/2001    Keeping et al.
2007/0231584 A1   10/2007   Hasegawa
(Continued)

FOREIGN PATENT DOCUMENTS

EP    3 034 297    6/2016
EP    3248775    11/2017
(Continued)

OTHER PUBLICATIONS

International Search Report dated Oct. 31, 2017 in International (PCT) Application No. PCT/JP2017/028137 with English translation.

(Continued)

*Primary Examiner* — Z. Jim Yang
(74) *Attorney, Agent, or Firm* — Wenderoth, Lind & Ponack, L.L.P.

(57) ABSTRACT

The present invention aims to provide an interlayer film for a colored laminated glass which exhibits a visible light transmittance Tv of 5% or lower, small variation in visible light transmittance and an excellent appearance when incorporated in a laminated glass together with two clear glass plates in conformity with JIS R3202 (1996), and a colored laminated glass produced using the interlayer film for a colored laminated glass. Provided is an interlayer film for a colored laminated glass exhibiting a visible light transmittance Tv of 5% or lower when incorporated in a laminated (Continued)

glass together with two clear glass plates in conformity with JIS R3202 (1996), the interlayer film for a colored laminated glass including a laminate of at least two layers including a first resin layer containing a thermoplastic resin and a colorant and a second resin layer containing a thermoplastic resin and no colorant, the first resin layer satisfying a ratio of a difference $\Delta t_1$ in thickness between the maximum value $t_{1max}$ and the minimum value $t_{1min}$ to an average thickness ($\Delta t_1$/average thickness of first resin layer) of 0.30 or less.

8 Claims, 1 Drawing Sheet

(51) Int. Cl.
| | | |
|---|---|---|
| B29C 48/21 | (2019.01) | |
| B32B 37/10 | (2006.01) | |
| B32B 37/18 | (2006.01) | |
| B32B 7/023 | (2019.01) | |
| C08K 3/04 | (2006.01) | |
| C08K 5/103 | (2006.01) | |
| C08L 29/14 | (2006.01) | |
| B32B 27/20 | (2006.01) | |
| B60J 1/00 | (2006.01) | |
| B29K 105/00 | (2006.01) | |
| B29L 7/00 | (2006.01) | |
| B29L 9/00 | (2006.01) | |

(52) U.S. Cl.
CPC .............. *B29C 48/21* (2019.02); *B32B 7/023* (2019.01); *B32B 17/10036* (2013.01); *B32B 17/10559* (2013.01); *B32B 17/10568* (2013.01); *B32B 17/10577* (2013.01); *B32B 17/10605* (2013.01); *B32B 17/10651* (2013.01); *B32B 17/10761* (2013.01); *B32B 27/20* (2013.01); *B32B 37/1018* (2013.01); *B32B 37/182* (2013.01); *B60J 1/001* (2013.01); *C08K 3/04* (2013.01); *C08K 5/103* (2013.01); *C08L 29/14* (2013.01); *B29K 2105/0032* (2013.01); *B29L 2007/008* (2013.01); *B29L 2009/00* (2013.01); *B32B 2250/04* (2013.01); *B32B 2250/40* (2013.01); *B32B 2307/402* (2013.01); *B32B 2307/4026* (2013.01); *B32B 2419/00* (2013.01); *B32B 2605/006* (2013.01)

(56) References Cited

U.S. PATENT DOCUMENTS

| | | |
|---|---|---|
| 2009/0098354 A1 | 4/2009 | Torr |
| 2009/0311497 A1 | 12/2009 | Aoki |
| 2015/0174862 A1 | 6/2015 | Kitano |
| 2016/0101602 A1 | 4/2016 | Kitano |
| 2016/0151995 A1 | 6/2016 | Kitano |
| 2016/0159050 A1 | 6/2016 | Lu et al. |
| 2016/0159997 A1 | 6/2016 | Yui |
| 2016/0288460 A1 | 10/2016 | Nakayama |
| 2017/0008257 A1 | 1/2017 | Nakayama |
| 2017/0015082 A1 | 1/2017 | Creytens |
| 2017/0144413 A1 | 5/2017 | Yamamoto |
| 2017/0274738 A1 | 9/2017 | Kanki |
| 2017/0361594 A1 | 12/2017 | Karagiannis |
| 2018/0104934 A1 | 4/2018 | Mori et al. |

FOREIGN PATENT DOCUMENTS

| | | |
|---|---|---|
| EP | 3 281 924 | 2/2018 |
| JP | 01-215621 | 8/1989 |
| JP | 07-062189 | 3/1995 |
| JP | 2007-055822 | 3/2007 |
| JP | 2010-248026 | 11/2010 |
| JP | 2012-106923 | 6/2012 |
| KR | 10-2007-0102688 | 10/2007 |
| WO | 2014/021459 | 2/2014 |
| WO | 2015/016358 | 2/2015 |
| WO | 2016/163486 | 10/2016 |

OTHER PUBLICATIONS

Extended European Search Report dated Feb. 10, 2020 in corresponding Europen Patent Application No. 17837039.1.
Extended European Search Report for EP Application No. 17837034.2 dated Mar. 10, 2020.
International Search Report dated Oct. 31, 2017 in International (PCT) Application No. PCT/JP2017/028132 with English translation.
Definition of the term "Flat" from the Oxford English Dictionary, Year 2000.

US 11,724,480 B2

INTERLAYER FILM FOR COLORED LAMINATED GLASS, AND COLORED LAMINATED GLASS

TECHNICAL FIELD

The present invention relates to an interlayer film for a colored laminated glass which exhibits, when incorporated in a laminated glass together with two clear glass plates in conformity with JIS R3202 (1996), a visible light transmittance Tv of 5% or lower, small variation in visible light transmittance and an excellent appearance, and a colored laminated glass produced using the interlayer film for a colored laminated glass.

BACKGROUND ART

Laminated glass is less likely to scatter even when shattered by external impact and can be safely used. Due to this advantage, laminated glass has been widely used, for example, in windshield, side glass, rear glass, and roof glass of vehicles including automobiles and windowpanes of aircraft, buildings, or the like. A known example of laminated glass is a type of laminated glass including at least a pair of glass plates integrated through, for example, an interlayer film for a laminated glass which contains a liquid plasticizer and a polyvinyl acetal resin.

Recently, glass has been desired to have various characteristics. From the standpoint of design characteristics, privacy protection, and light blocking properties, a colored laminated glass is now desired. In particular, highly colored laminated glass having a visible light transmittance Tv of 5% or lower is suitably used in roof glass of vehicles, windowpanes of buildings, or the like because it can exhibit particularly high privacy protection. Moreover, along with the spread of mirrorless cars equipped with onboard cameras, highly colored laminated glass is presumably used also in side glass of cars.

Colored laminated glass is commonly produced using an interlayer film for a laminated glass which contains a colorant such as a pigment (see Patent Literature 1, for example). However, an interlayer film for a laminated glass needs to contain a large amount of colorant to achieve the visible light transmittance Tv of 5% or lower in this method. An interlayer film for a laminated glass containing such a large amount of colorant has great variation in visible light transmittance from portion to portion, leading to an improper appearance.

CITATION LIST

Patent Literature

Patent Literature 1: JP 2010-248026 A

SUMMARY OF INVENTION

Technical Problem

The present invention aims to, in consideration of the state of the art, an interlayer film for a colored laminated glass which exhibits, when incorporated in a laminated glass together with two clear glass plates in conformity with JIS R3202 (1996), a visible light transmittance Tv of 5% or lower, small variation in visible light transmittance from portion to portion and an excellent appearance, and a colored laminated glass produced using the interlayer film for a colored laminated glass.

Solution to Problem

The present invention relates to an interlayer film for a colored laminated glass exhibiting a visible light transmittance Tv of 5% or lower when incorporated in a laminated glass together with two clear glass plates in conformity with JIS R3202 (1996), the interlayer film for a colored laminated glass including a laminate of at least two layers including a first resin layer containing a thermoplastic resin and a colorant and a second resin layer containing a thermoplastic resin and no colorant, the first resin layer satisfying a ratio of a difference $\Delta t_1$ in thickness between the maximum value $t_{1max}$ and the minimum value $t_{1min}$ to an average thickness ($\Delta t_1$/average thickness of first resin layer) of 0.30 or less.

The present invention is specifically described in the following.

The present inventors studied about the cause of the variation in visible light transmittance from portion to portion in an interlayer film for a colored laminated glass exhibiting a visible light transmittance Tv of 5% or lower when incorporated in a laminated glass produced using two clear glass plates in conformity with JIS R3202 (1996), to find out an issue of transfer. The interlayer film for a laminated glass is commonly stored in the state of being wound into a roll, and unwound from the roll to be provided in production of a laminated glass. In the case of using an interlayer film for a laminated glass containing a large amount of colorant to set the visible light transmittance Tv to 5% or lower when incorporated in a laminated glass together with two clear glass plates in conformity with JIS R3202 (1996), the colorant is likely to partly bleed out to the surface of the interlayer film for a laminated glass. In such a case, the bleeding colorant may be transferred to another interlayer film for a laminated glass or a hand of an operator during the storage of the interlayer film for a colored laminated glass in the form of a roll or during the processing of the interlayer film for a laminated glass unwound from the roll. In a part where transfer occurred, the amount of the colorant is reduced, resulting in a visible light transmittance different from that of the surrounding part.

To overcome the situation, the present inventors made an interlayer film for a colored laminated glass including a laminate of at least two layers including a first resin layer containing a thermoplastic resin and a colorant and a second resin layer containing a thermoplastic resin and no colorant. Lamination of the second resin layer not containing a colorant can prevent transfer of colorants from the first resin layer containing a colorant. In particular, in the case of a laminate including three or more layers in which a first resin layer containing a colorant is interposed between second resin layers containing no colorant, the colorant is hardly transferred from the first resin layer containing the colorant.

However, even in the case of an interlayer film for a colored laminated glass including such a laminate, variation in the visible light transmittance from portion to portion may not be sufficiently prevented. The present inventors made further intensive studies to find out that variation in thickness of the first resin layer causes variation in visible light transmittance. They found out that, when the first resin layer satisfies a ratio of a difference $\Delta t_1$ in thickness between the maximum value $t_{1max}$ and the minimum value $t_{1min}$ to an average thickness ($\Delta t_1$/average thickness of first resin layer)

of 0.30 or less, variation in visible light transmittance from portion to portion can be reduced. Thus, the present invention was completed.

The interlayer film for a colored laminated glass of the present invention includes a laminate of at least two layers including a first resin layer containing a thermoplastic resin and a colorant and a second resin layer containing a thermoplastic resin and no colorant. The first resin layer adjusts the visible light transmittance of the interlayer film for a colored laminated glass of the present invention. The second resin layer formed on the first resin layer prevents transfer of the colorant from the first resin layer to reduce variation in visible light transmittance from portion to portion.

The interlayer film for a colored laminated glass of the present invention is preferably a laminate of at least three layers including the first resin layer interposed between two second resin layers.

The first resin layer may be provided on the entire surface or a part of the interlayer film for a colored laminated glass of the present invention. For example, a shade in the windshield of an automobile can be prepared by providing the first resin layer on a part of the interlayer film for a laminated glass.

The interlayer film for a colored laminated glass of the present invention processed into the laminate can also exert an effect of suppressing an increase of the haze value of the resulting interlayer film for a colored laminated glass.

An interlayer film for a laminated glass including a laminate is commonly produced by a co-extrusion method. In this method, individual formation of the first resin layer and the second resin layer in production of a laminate enables extrusion of the first resin layer and the second resin layer in separate extruders. Such separation can suppress heat generation due to kneading upon extrusion to prevent an increase in the haze value caused by such heat generation.

The first resin layer contains a thermoplastic resin and a colorant.

Examples of the thermoplastic resin include polyvinylidene fluoride, polytetrafluoroethylene, vinylidene fluoride-propylene hexafluoride copolymers, polyethylene trifluoride, acrylonitrile-butadiene-styrene copolymers, polyesters, polyethers, polyamides, polycarbonates, polyacrylates, polymethacrylates, polyvinyl chloride, polyethylene, polypropylene, polystyrene, polyvinyl acetals, and ethylene-vinyl acetate copolymers. In particular, the resin layer contains preferably a polyvinyl acetal or an ethylene-vinyl acetate copolymer, more preferably a polyvinyl acetal.

The polyvinyl acetal can be prepared by acetalizing polyvinyl alcohol with an aldehyde. The polyvinyl alcohol can be prepared by saponifying polyvinyl acetate, for example. The degree of saponification of the polyvinyl alcohol is commonly within a range of 70 to 99.8 mol %.

The average degree of polymerization of the polyvinyl alcohol is preferably 200 or higher, more preferably 500 or higher, still more preferably 1,700 or higher, particularly preferably higher than 1,700, and preferably 5,000 or lower, more preferably 4,000 or lower, still more preferably 3,000 or lower, particularly preferably lower than 3,000. When the average degree of polymerization is equal to or higher than the lower limit, the penetration resistance of the laminated glass is further enhanced. When the average degree of polymerization is equal to or lower than the upper limit, the formation of the interlayer film is facilitated.

The average degree of polymerization of the polyvinyl alcohol is obtained by the method in conformity with "Testing methods for polyvinyl alcohol", JIS K6726.

The carbon number of the acetal group in the polyvinyl acetal is not particularly limited. The aldehyde used for preparation of the polyvinyl acetal is not particularly limited. The lower limit of the carbon number of the acetal group in the polyvinyl acetal is preferably 3, and the upper limit thereof is preferably 6. When the carbon number of the acetal group in the polyvinyl acetal is 3 or more, the glass transition temperature of the interlayer film is sufficiently lowered and bleeding of the plasticizer can be prevented. When the carbon number of the aldehyde is 6 or less, synthesis of the polyvinyl acetal is facilitated, ensuring the productivity. The C3-C6 aldehyde may be a linear or branched aldehyde, and examples thereof include n-butyraldehyde and n-valeraldehyde.

The aldehyde is not particularly limited. Commonly, the aldehyde is preferably a C1-C10 aldehyde. Examples of the C1-C10 aldehyde include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Among these, preferred is propionaldehyde, n-butyraldehyde, isobutyraldehyde, n-hexylaldehyde, or n-valeraldehyde, more preferred is propionaldehyde, n-butyraldehyde, or isobutyraldehyde, and still more preferred is n-butyraldehyde. One aldehyde may be used alone, or two or more aldehydes may be used in combination.

The content rate of hydroxy groups (hydroxy group content) of the polyvinyl acetal is preferably 10 mol % or higher, more preferably 15 mol % or higher, still more preferably 18 mol % or higher, and preferably 40 mol % or lower, more preferably 35 mol % or lower. When the content rate of hydroxy groups is equal to or higher than the lower limit, the adhesion force of the interlayer film is further enhanced. When the content rate of hydroxy groups is equal to or lower than the upper limit, the flexibility of the interlayer film is improved to facilitate handling of the interlayer film.

The content rate of hydroxy groups of the polyvinyl acetal is a value in percentage of the mole fraction obtained by dividing the amount of ethylene groups to which hydroxy groups are bonded by the amount of all the ethylene groups in the main chain. The amount of ethylene groups to which hydroxy groups are bonded can be determined by the measurement in conformity with "Testing methods for polyvinyl alcohol", JIS K6726 or in conformity with ASTM D1396-92.

The degree of acetylation (acetyl group content) of the polyvinyl acetal is preferably 0.1 mol % or higher, more preferably 0.3 mol % or higher, still more preferably 0.5 mol % or higher, and preferably 30 mol % or lower, more preferably 25 mol % or lower, still more preferably 20 mol % or lower. When the degree of acetylation is equal to or higher than the lower limit, the compatibility between the polyvinyl acetal and the plasticizer is enhanced. When the degree of acetylation is equal to or lower than the upper limit, the moisture resistance of the interlayer film and the laminated glass is improved.

The degree of acetylation is a value in percentage of the mole fraction obtained by subtracting the amount of ethylene groups to which acetal groups are bonded and the amount of ethylene groups to which hydroxy groups are bonded from the amount of all the ethylene groups in the main chain and dividing the resulting value by the amount of all the ethylene groups in the main chain. The amount of ethylene groups to which acetal groups are bonded can be measured in conformity with "Testing methods for polyvinyl butyral", JIS K6728 or in conformity with ASTM D1396-92.

The degree of acetalization of the polyvinyl acetal (degree of butyralization in the case of polyvinyl butyral resin) is preferably 50 mol % or higher, more preferably 53 mol % or higher, still more preferably 60 mol % or higher, particularly preferably 63 mol % or higher, and preferably 85 mol % or lower, more preferably 75 mol % or lower, still more preferably 70 mol % or lower. When the degree of acetalization is equal to or higher than the lower limit, the compatibility between the polyvinyl acetal and the plasticizer is enhanced. When the degree of acetalization is equal to or lower than the upper limit, the reaction time needed for producing the polyvinyl acetal is reduced.

The degree of acetalization is a value in percentage of the mole fraction obtained by dividing the amount of ethylene groups to which acetal groups are bonded by the amount of all the ethylene groups in the main chain.

The degree of acetalization is obtainable by measuring the degree of acetylation and the content rate of hydroxy groups by a method in conformity with "Testing methods for polyvinyl butyral", JIS K6728 or in conformity with ASTM D1396-92, calculating the mole fractions based on the measurement results, and subtracting the mole fractions corresponding to the degree of acetylation and the content rate of hydroxy groups from 100 mol %.

The content rate of hydroxy groups (hydroxy group content), degree of acetalization (degree of butyralization), and degree of acetylation are preferably calculated based on the measurement results by methods in conformity with "Testing methods for polyvinyl butyral", JIS K6728. In the case where the polyvinyl acetal is a polyvinyl butyral resin, the content rate of hydroxy groups (hydroxy group content), degree of acetalization (degree of butyralization), and degree of acetylation are preferably calculated based on the measurement results by methods in conformity with "Testing methods for polyvinyl butyral", JIS K6728.

The colorant is not particularly limited, and any pigment or dye conventionally used for interlayer films for a laminated glass may be used. In particular, a pigment is favorably used because it can easily set the visible light transmittance Tv of a colored laminated glass to 5% or lower.

The pigment is not particularly limited, and examples thereof include phthalocyanine, derivatives of phthalocyanine, anthraquinone, derivatives of anthraquinone, perylene, derivatives of perylene, titanium oxide, derivatives of titanium oxide, azo compounds, and carbon black. In particular, preferred are phthalocyanine, derivatives of phthalocyanine, anthraquinone, derivatives of anthraquinone, perylene, derivatives of perylene, and carbon black, and particularly preferred is carbon black because they are highly compatible with the thermoplastic resin and are less likely to bleed out.

The amount of the colorant in the first resin layer is not particularly limited as long as the visible light transmittance Tv can be set to 5% or lower in a laminated glass produced using two clear glass plates in conformity with JIS R3202 (1996). For example, in the case where the colorant is carbon black, the lower limit of the amount of carbon black relative to 100% by mass of the first resin layer is preferably 0.01% by mass and the upper limit thereof is preferably 0.30% by mass. When the amount of the carbon black is within this range, the visible light transmittance Tv of the colored laminated glass can be adjusted to 5% or lower while preventing bleeding thereof. The lower limit of the amount of the colorant is more preferably 0.02% by mass and the upper limit thereof is more preferably 0.20% by mass. The lower limit is still more preferably 0.03% by mass and the upper limit is still more preferably 0.10% by mass. The upper limit is particularly preferably 0.08% by mass, most preferably 0.05% by mass.

The first resin layer preferably contains a plasticizer.

The plasticizer is not particularly limited as long as it is a plasticizer commonly used for interlayer films for a laminated glass, and examples thereof include organic plasticizers such as monobasic organic acid esters and polybasic organic acid esters and phosphoric acid plasticizers such as organophosphate compounds and organophosphite compounds.

Examples of the organic plasticizers include triethylene glycol-di-2-ethylhexanoate, triethylene glycol-di-2-ethylbutyrate, triethylene glycol-di-n-heptanoate, tetraethylene glycol-di-2-ethylhexanoate, tetraethylene glycol-di-2-ethylbutyrate, tetraethylene glycol-di-n-heptanoate, diethylene glycol-di-2-ethylhexanoate, diethylene glycol-di-2-ethylbutyrate, and diethylene glycol-di-n-heptanoate. In particular, the resin layer contains preferably triethylene glycol-di-2-ethylhexanoate, triethylene glycol-di-2-ethylbutyrate, or triethylene glycol-di-n-heptanoate, more preferably triethylene glycol-di-2-ethylhexanoate.

The amount of the plasticizer in the first resin layer is not particularly limited. The lower limit of the amount of the plasticizer relative to 100 parts by mass of the thermoplastic resin is preferably 25 parts by mass and the upper limit thereof is preferably 80 parts by mass. When the amount of the plasticizer is within this range, high penetration resistance can be exhibited. The lower limit of the amount of the plasticizer is more preferably 30 parts by mass and the upper limit thereof is more preferably 70 parts by mass.

In the case where the first resin layer serves as an outermost layer to be directly in contact with glass, the first resin layer preferably contains an adhesion modifier.

As the adhesion modifier, an alkali metal salt or an alkaline earth metal salt is preferably used, for example. Examples of the adhesion modifier include salts of potassium, sodium, magnesium, and the like. In particular, preferred is a magnesium salt because the adhesion force between glass and the interlayer film can be easily adjusted in production of a laminated glass.

Examples of the acid constituting the salts include organic acids such as carboxylic acids (e.g., octylic acid, hexylic acid, 2-ethylbutyric acid, butyric acid, acetic acid, formic acid) and inorganic acids such as hydrochloric acid and nitric acid.

The first resin layer may optionally contain additives such as an antioxidant, a light stabilizer, a modified silicone oil as an adhesion modifier, a flame retardant, an antistatic agent, a damp proofing agent, a heat ray reflecting agent, a fluorescent agent, or a heat absorber.

The second resin layer contains a thermoplastic resin. Examples of the thermoplastic resin contained in the second resin layer include those exemplified as the thermoplastic resin contained in the first resin layer.

The second resin layer may contain the plasticizer, an adhesion modifier, and optionally additives such as an antioxidant, a light stabilizer, a modified silicone oil as an adhesion modifier, a flame retardant, an antistatic agent, a damp proofing agent, a heat ray reflecting agent, a fluorescent agent, or a heat absorber.

The second resin layer does not contain a colorant. The second resin layer may contain a colorant in a small amount that does not cause bleeding or transfer. Also in the case where the colorant contained in the first resin layer is partly transferred to the second resin layer originally not containing a colorant, the second resin layer may contain a colorant as long as the amount of the colorant is small enough to avoid bleeding or transfer. Specifically, for example, the colorant in an amount of 0.001 parts by mass or less relative to 100 parts by mass of the thermoplastic resin does not cause bleeding or transfer, not impairing the excellent effects of the present invention.

In the case where the second resin layer contains a colorant, the same colorant as that contained in the first resin layer may be used.

In the interlayer film for a colored laminated glass of the present invention, the first resin layer satisfies a ratio of a difference $\Delta t_1$ in thickness between the maximum value $t_{1max}$ and the minimum value $t_{1min}$ to an average thickness ($\Delta t_1$/average thickness of first resin layer) of 0.30 or less. Specifically, when the variation in thickness of the first resin layer relative to the average thickness thereof is suppressed to a certain level or less, variation in visible light transmittance from portion to portion in the entire interlayer film for a colored laminated glass can be suppressed. The ratio ($\Delta t_1$/average thickness of first resin layer) is preferably 0.25 or less, more preferably 0.22 or less.

The thickness of each resin layer of the interlayer film for a colored laminated glass can be obtained by cutting the interlayer film in a direction perpendicular to the thickness direction with a sharp razor blade so that the cross section of each resin layer is exposed, observing the exposed cross section of the interlayer film with a digital microscope (e.g., "DSX500" available from Olympus Corporation), and measuring the thickness of each resin layer of the interlayer film using a scale bar (micro gauge) and simple measurement function. In the simple measurement function, the parallel width distance or the distance between two points is preferably selected. The observation is preferably performed under magnification of 277 times. The visual field is preferably 980 μm×980 μm. Arbitrarily selected 20 sites of the interlayer film for a colored laminated glass are observed using the digital microscope, and the thickness of each resin layer is measured at 5 sites in the same visual field. The maximum value, minimum value, and average of each resin layer were obtained from the measurement results at 100 sites (20×5 sites) in total. The maximum value $t_{1max}$ and minimum value $t_{1min}$ of the thickness of the first resin layer, the maximum value $t_{2max}$ and minimum value $t_{2min}$ of the thickness of the second resin layer, the average thickness of the first resin layer, and the average thickness of the second resin layer are obtained.

The ratio ($\Delta t_1$/average thickness of first resin layer) may be set to 0.30 or less by any method. An exemplary method includes adjusting the thicknesses of the first resin layer and the second resin layer.

An interlayer film for a laminated glass including a laminate is commonly produced by a co-extrusion method. When the first resin layer is set relatively thick in this method, variation in thickness of the first resin layer can be minimized.

Specifically, the average thickness of the first resin layer is preferably 100 to 500 μm and the average thickness of the second resin layer is preferably 100 μm or more.

When the average thickness of the first resin layer is within the range of 100 to 500 μm, the visible light transmittance Tv can be easily adjusted to 5% or lower by adding the colorant in production of a laminated glass using two clear glass plates in conformity with JIS R3202 (1996). The lower limit of the average thickness of the first resin layer is more preferably 150 and the upper limit thereof is more preferably 450 μm. The lower limit is still more preferably 200 μm and the upper limit is still more preferably 400 μm. The lower limit is particularly preferably 300 μm.

When the average thickness of the second resin layer is 100 μm or more, variation in the average thickness of the first resin layer can be suppressed. The average thickness of the second resin layer is more preferably 200 μm or more, still more preferably 250 μm or more. The upper limit of the average thickness of the second resin layer is not particularly limited, and is practically about 1,000 μm.

In the case of producing the interlayer film for a colored laminated glass of the present invention by a co-extrusion method, a feed block method is preferably employed. For details of the feed block method, see JP 5220607 B. A device for producing an interlayer film for a laminated glass in the feed block method has a first extruder for forming an outermost surface layer. To the first extruder is connected a first feed hole provided in a guide for arranging a layer, and to the first feed hole is connected one end of a channel for forming an outermost surface layer in the guide for arranging a layer. The channel for forming an outermost surface layer is branched at the middle into first and second branch channels. The end portions of the first and second branch channels are respectively connected to the first and second outlets for forming the outermost surface layer.

Employment of the feed block method allows setting of the thickness or width of the first resin layer as desired in production of an interlayer film for a colored laminated glass in which the first resin layer is only partly provided, and enables production of an interlayer film for a colored laminated glass with no color streaks or color omission.

The interlayer film for a colored laminated glass of the present invention provides a laminated glass having a visible light transmittance Tv of 5% or lower when used in production of a laminated glass together with two clear glass plates in conformity with JIS R3202 (1996). The interlayer film with such a visible light transmittance can exhibit excellent design characteristics, privacy protection, light blocking effect, or the like, and can be suitably used for side glass, rear glass, or roof glass of vehicles or windowpanes of buildings or the like. The interlayer film for a colored laminated glass of the present invention preferably has a visible light transmittance Tv of 2% or lower.

The visible light transmittance is measured by the following procedure. A laminated glass is produced using two clear glass plates in conformity with JIS R3202 (1996). The visible light transmittance within a wavelength range of 380 to 780 nm of the obtained laminated glass is measured at arbitrarily selected 20 sites using a spectrophotometer (e.g., "U-4100" available from Hitachi High-Technologies Corporation) in conformity with JIS R 3106 (1998). The average and the standard deviation of the visible light transmittances measured at 20 sites are obtained, and the value obtained by dividing the obtained standard deviation by the average of the visible light transmittances (standard deviation/average of visible light transmittance×100) is taken as the CV value.

Preferably, the two clear glass plates in conformity with JIS R3202 (1996) each have a thickness of 2.4 to 2.5 mm and a visible light transmittance of 90.0 to 91.0% because measurement variation can be suppressed in the measurement of the visible light transmittance after production of a laminated glass. In particular, each clear glass plate more preferably has a thickness of 2.5 mm and a visible light transmittance of 90.5%.

The interlayer film for a colored laminated glass of the present invention preferably has a large number of recesses on at least one surface that is to be in contact with glass. With such a structure, deaeration properties during production of a laminated glass can be ensured. In the case of the interlayer film for a colored laminated glass of the present invention in which the average thicknesses of the first resin layer and the second resin layer are adjusted for the purpose of setting the ratio ($\Delta t_1$/average thickness of first resin layer) to 0.30 or less, formation of a large number of recesses on the surface hardly affects the variation in visible light transmittance.

In the interlayer film for a colored laminated glass of the present invention, preferably, the recesses each have a groove shape with a continuous bottom (shape of an engraved line) and they are regularly arranged side by side.

In the interlayer film for a colored laminated glass of the present invention, preferably, the recesses each have a groove shape with a continuous bottom and they are arranged side by side in parallel to each other. Moreover, in the interlayer film for a colored laminated glass of the present invention, preferably, the recesses each have a groove shape with a continuous bottom and they are regularly arranged side by side in parallel to each other.

Commonly, easiness of deaeration upon preliminary pressure bonding and final pressure bonding of a laminate including two glass plates and an interlayer film for a laminated glass interposed between the two glass plates closely relates to the communication properties and smoothness of the bottoms of the recesses.

When the recesses on at least one surface of the interlayer film for a laminated glass each have a groove shape with a continuous bottom and they are regularly arranged side by side, the communication properties of the bottom is enhanced to remarkably improve the deaeration properties during preliminary pressure bonding and final pressure bonding.

When the recesses on at least one surface of the interlayer film for a laminated glass each have a groove shape with a continuous bottom and they are arranged side by side in parallel to each other, the communication properties of the bottom are enhanced to remarkably improve the deaeration properties during preliminary pressure bonding and final pressure bonding.

Moreover, when the recesses on at least one surface of the interlayer film for a laminated glass each have a groove shape with a continuous bottom and they are regularly arranged side by side in parallel to each other, the communication properties of the bottom are further enhanced to more remarkably improve the deaeration properties during preliminary pressure bonding and final pressure bonding.

The state of "regularly arranged side by side" means that the recesses each having a groove shape with a continuous bottom are arranged side by side in a cyclic manner in a certain direction upon observation of the surface of the interlayer film with recesses. The state of "arranged side by side in parallel to each other" means both a state where the recesses adjacent to each other are arranged side by side in parallel to each other at equal intervals and a state where the recesses adjacent to each other are arranged side by side in parallel to each other but the intervals therebetween are not necessarily equal to each other.

FIGS. 1 and 2 each schematically illustrate an exemplary interlayer film for a laminated glass in which recesses each having a groove shape with a continuous bottom are arranged at equal intervals and the recesses adjacent to each other are arranged side by side in parallel to each other on the surface. FIG. 3 shows image data of 3D roughness of the surface of the interlayer film for a laminated glass in which recesses each having a groove shape with a continuous bottom are regularly arranged side by side, obtained using a 3D profilometer ("KS-1100" with a tip head of "LT-9510VM" available from Keyence Corporation).

The lower limit of the roughness (Rz) of the surface with the recesses is preferably 5 µm and the upper limit thereof is preferably 90 µm. With the roughness (Rz) of the surface with the recesses within this range, excellent deaeration properties can be exhibited.

The roughness (Rz) of the surface with recesses herein is measured by a method in conformity with JIS B-0601 (1994).

The roughness (Rz) of the surface with the recesses herein means the ten-point average roughness (Rz), which is defined in "Surface roughness—Definition and designation" JIS B-0601 (1994), of the resulting interlayer film obtained by a method in conformity with JIS B-0601 (1994). The roughness (Rz) of the recesses can be measured, for example, using "Surfcorder SE300" available from Kosaka Laboratory Ltd. under the probe meter conditions of a cut-off value of 2.5 mm, a reference length of 2.5 mm, an evaluation length of 12.5 mm, a tip radius of a probe of 2 µm, a tip angle of 60°, and a measurement speed of 0.5 mm/s. The measurement is performed in an environment of 23° C. and 30 RH %. In the case where the recesses are in the shape of engraved lines, the probe is moved in a direction perpendicular to the groove direction. In the case where the recesses are not in the shape of engraved lines, the probe may be moved in any direction.

The lower limit of the roughness (Rz) of the recesses in the shape of engraved lines is preferably 10 µm and the upper limit thereof is preferably 90 µm. When the roughness (Rz) of the recesses in the shape of engraved lines is within this range, excellent deaeration properties can be exhibited. The lower limit of the roughness (Rz) of the recesses in the shape of engraved lines is more preferably 20 µm and the upper limit thereof is more preferably 80 µm.

The roughness (Rz) of the recesses in the shape of engraved lines herein is measured by a method in conformity with JIS B-0601 (1994).

The lower limit of the interval between the adjacent recesses in the shape of engraved lines is preferably 10 µm and the upper limit thereof is preferably 500 µm. When the interval between the recesses in the shape of engraved lines is within this range, excellent deaeration properties can be exhibited. The lower limit of the interval between the recesses in the shape of engraved lines is more preferably 50 µm and the upper limit thereof is more preferably 300 µm.

The interval between the recesses in the shape of engraved lines herein can be obtained by observing first and second surfaces (observation range: 20 mm×20 mm) of the interlayer film for a laminated glass with an optical microscope (e.g., "BS-8000III" available from Sonic Corp.) to measure the intervals between adjacent recesses and calculating the average of the shortest distances between deepest bottoms of the adjacent recesses.

In the case where the recesses are not in the shape of engraved lines, the interval Sm between the recesses on the surface with the recesses is preferably 600 µm or less, more preferably 450 µm or less, still more preferably 400 µm or less, particularly preferably 350 µm or less. With such an interval, the autohesion force between the interlayer films for a laminated glass when wound into a roll can be lowered, facilitating unwinding of the interlayer film.

The interval between the recesses in the case where the recesses are not in the shape of engraved lines herein means, for example, the average interval (Sm) between the recesses of the resulting interlayer film obtained by a method in conformity with JIS B-0601 (1994), defined in "Surface roughness—Definition and designation" JIS B-0601 (1994). The interval Sm between the recesses can be measured, for example, using "Surfcorder SE300" available from Kosaka Laboratory Ltd. under the probe meter conditions of a cut-off value of 2.5 mm, a reference length of 2.5 mm, an evaluation length of 12.5 mm, a tip radius of a probe of 2 μm, a tip angle of 60°, and a measurement speed of 0.5 mm/s. The measurement is performed in an environment of 23° C. and 30 RH %. The probe may be moved in any direction.

The interlayer film for a colored laminated glass of the present invention including a specific combination of the first resin layer and the second resin layer can impart a function to the resulting laminated glass. For example, sound insulation properties can be imparted. A combination for imparting sound insulation properties is preferably a combination of a sound insulation layer as the first resin layer and a protective layer as the second resin layer. Preferably, the combination includes the sound insulation layer containing polyvinyl acetal X, a plasticizer, and a colorant and the protective layer containing polyvinyl acetal Y and a plasticizer. In the case where the sound insulation layer is interposed between two protective layers, an interlayer film for a laminated glass having excellent sound insulation properties (hereafter, also referred to as a sound insulation interlayer film) can be obtained. The sound insulation interlayer film is more specifically described in the following.

In the sound insulation interlayer film, the sound insulation layer imparts sound insulation properties. The sound insulation layer preferably contains polyvinyl acetal X, a colorant, and a plasticizer. The polyvinyl acetal X can be prepared by acetalizing polyvinyl alcohol with an aldehyde. The polyvinyl alcohol is commonly prepared by saponifying polyvinyl acetate.

The lower limit of the average degree of polymerization of the polyvinyl alcohol is preferably 200 and the upper limit thereof is preferably 5,000. When the polyvinyl alcohol has an average degree of polymerization of 200 or higher, the resulting sound insulation interlayer film has better penetration resistance. When the polyvinyl alcohol has an average degree of polymerization of 5,000 or lower, the formability of the sound insulation layer can be ensured. The lower limit of the average degree of polymerization of the polyvinyl alcohol is more preferably 500 and the upper limit thereof is more preferably 4,000.

The average degree of polymerization of the polyvinyl alcohol is obtained by a method in conformity with "Testing methods for polyvinyl alcohol", JIS K6726.

The lower limit of the carbon number of the aldehyde used for acetalization of the polyvinyl alcohol is preferably 4 and the upper limit thereof is preferably 6. When the aldehyde has a carbon number of 4 or more, the sound insulation layer can stably contain a sufficient amount of plasticizer to exhibit excellent sound insulation properties. In addition, bleeding of the plasticizer can be prevented. When the aldehyde has a carbon number of 6 or less, synthesis of the polyvinyl acetal X is facilitated, ensuring the productivity. The aldehyde having a carbon number of 4 to 6 may be a linear or branched aldehyde, and examples thereof include n-butyraldehyde and n-valeraldehyde.

The upper limit of the hydroxy group content of the polyvinyl acetal X is preferably 30 mol %. When the polyvinyl acetal X has a hydroxy group content of 30 mol % or less, the sound insulation layer can contain a plasticizer in an amount needed for exhibiting sound insulation properties and bleeding of the plasticizer can be prevented. The upper limit of the hydroxy group content of the polyvinyl acetal X is more preferably 28 mol %, still more preferably 26 mol %, particularly preferably 24 mol % and the lower limit thereof is preferably 10 mol %, more preferably 15 mol %, still more preferably 20 mol %. The hydroxy group content of the polyvinyl acetal X is a value in percentage (mol %) of the mole fraction obtained by dividing the amount of ethylene groups to which hydroxy groups are bonded by the amount of all the ethylene groups in the main chain. The amount of ethylene groups to which hydroxy groups are bonded can be obtained by measuring the amount of ethylene groups to which hydroxy groups are bonded in the polyvinyl acetal X by a method in conformity with "Testing methods for polyvinyl butyral", JIS K6728.

The lower limit of the degree of acetalization of the polyvinyl acetal X is preferably 60 mol % and the upper limit thereof is preferably 85 mol %. When the degree of acetalization of the polyvinyl acetal X is 60 mol % or higher, the sound insulation layer has higher hydrophobicity to be able to contain a plasticizer in an amount needed for exhibiting sound insulation properties. In addition, bleeding of the plasticizer and whitening can be prevented. When the degree of acetalization of the polyvinyl acetal X is 85 mol % or lower, synthesis of the polyvinyl acetal X is facilitated to ensure the productivity. The lower limit of the degree of acetalization of the polyvinyl acetal X is more preferably 65 mol %, still more preferably 68 mol % or higher.

The degree of acetalization can be obtained by measuring the amount of ethylene groups to which acetal groups are bonded in the polyvinyl acetal X by the method in conformity with "Testing methods for polyvinyl butyral", JIS K6728.

The lower limit of the degree of acetylation of the polyvinyl acetal X is preferably 0.1 mol % and the upper limit thereof is preferably 30 mol %. When the polyvinyl acetal X has a degree of acetylation of 0.1 mol % or higher, the sound insulation layer can contain a plasticizer in an amount needed for exhibiting sound insulation properties. In addition, bleeding of the plasticizer can be prevented. When the polyvinyl acetal X has a degree of acetylation of 30 mol % or lower, the sound insulation layer has higher hydrophobicity, thereby preventing whitening. The lower limit of the degree of acetylation is more preferably 1 mol %, still more preferably 5 mol %, particularly preferably 8 mol % and the upper limit thereof is more preferably 25 mol %, still more preferably 20 mol %. The degree of acetylation is a value in percentage of the mole fraction (mol %) obtained by subtracting the amount of ethylene groups to which acetal groups are bonded and the amount of ethylene groups to which hydroxy groups are bonded from the amount of all the ethylene groups in the main chain and dividing the resulting value by the amount of all the ethylene groups in the main chain.

In particular, the polyvinyl acetal X preferably is a polyvinyl acetal having a degree of acetylation of 8 mol % or higher or a polyvinyl acetal having a degree of acetylation of lower than 8 mol % and a degree of acetalization of 65 mol % or higher because the sound insulation layer can easily contain a plasticizer in an amount needed for exhibiting sound insulation properties. The polyvinyl acetal X is more preferably a polyvinyl acetal having a degree of acetylation of 8 mol % or higher or a polyvinyl acetal having a degree of acetylation of lower than 8 mol % and a degree of acetalization of 68 mol % or higher.

The lower limit of the amount of the plasticizer in the sound insulation layer is preferably 45 parts by mass and the upper limit thereof is preferably 80 parts by mass, relative to 100 parts by mass of the polyvinyl acetal X. When the amount of the plasticizer is 45 parts by mass or more, high sound insulation properties can be exhibited. When the amount of the plasticizer is 80 parts by mass or less, reduction in transparency or adhesiveness of the interlayer film for a laminated glass caused by bleeding of the plasticizer can be prevented. The lower limit of the amount of the plasticizer is more preferably 50 parts by mass, still more preferably 55 parts by mass and the upper limit thereof is more preferably 75 parts by mass, still more preferably 70 parts by mass.

The lower limit of the average thickness of the sound insulation layer is preferably 100 μm and the upper limit thereof is preferably 500 μm. With the average thickness of the sound insulation layer within this range, the visible light transmittance Tv can be easily adjusted to 5% or lower when a laminated glass is produced with addition of the colorant using two clear glass plates in conformity with JIS R3202 (1996). In addition, sound insulation properties can be improved. The lower limit of the average thickness of the sound insulation layer is more preferably 150 μm and the upper limit thereof is more preferably 450 μm. The lower limit is still more preferably 200 μm and the upper limit is still more preferably 400 μm. The lower limit is particularly preferably 300 μm.

The protective layer prevents reduction in adhesiveness between the interlayer film for a laminated glass and glass due to bleeding of a large amount of plasticizer contained in the sound insulation layer and also imparts penetration resistance to the interlayer film for a laminated glass.

The protective layer contains preferably polyvinyl acetal Y and a plasticizer, more preferably polyvinyl acetal Y having a higher hydroxy group content than the polyvinyl acetal X and a plasticizer.

The polyvinyl acetal Y can be prepared by acetalizing polyvinyl alcohol with an aldehyde. The polyvinyl alcohol can be normally prepared by saponifying polyvinyl acetate.

The lower limit of the average degree of polymerization of the polyvinyl alcohol is preferably 200 and the upper limit thereof is preferably 5,000. When the polyvinyl alcohol has an average degree of polymerization of 200 or higher, the interlayer film for a laminated glass has better penetration resistance. When the polyvinyl alcohol has an average degree of polymerization of 5,000 or lower, the formability of the sound insulation layer can be ensured. The lower limit of the average degree of polymerization of the polyvinyl alcohol is more preferably 500 and the upper limit thereof is more preferably 4,000.

The lower limit of the carbon number of the aldehyde for acetalization of the polyvinyl alcohol is preferably 3 and the upper limit thereof is preferably 4. When the aldehyde has a carbon number of 3 or more, the interlayer film for a laminated glass has better penetration resistance. When the aldehyde has a carbon number of 4 or less, the productivity of the polyvinyl acetal Y is improved.

The C3-C4 aldehyde may be a linear or branched aldehyde, and examples thereof include n-butyraldehyde.

The upper limit of the hydroxy group content of the polyvinyl acetal Y is preferably 33 mol % and the lower limit thereof is preferably 28 mol %. When the polyvinyl acetal Y has a hydroxy group content of 33 mol % or lower, whitening of the interlayer film for a laminated glass can be prevented. When the polyvinyl acetal Y has a hydroxy group content of 28 mol % or higher, the penetration resistance of the interlayer film for a laminated glass can be improved.

The lower limit of the degree of acetalization of the polyvinyl acetal Y is preferably 60 mol % and the upper limit thereof is preferably 80 mol %. When the degree of acetalization is 60 mol % or higher, the protective layer can contain a plasticizer in an amount needed for exhibiting sufficient penetration resistance. When the degree of acetalization is 80 mol % or lower, the adhesion force between the protective layer and glass can be ensured. The lower limit of the degree of acetalization is more preferably 65 mol % and the upper limit thereof is more preferably 69 mol %.

The upper limit of the degree of acetylation of the polyvinyl acetal Y is preferably 7 mol %. When the degree of acetylation of the polyvinyl acetal Y is 7 mol % or lower, the protective layer has higher hydrophobicity, thereby preventing whitening. The upper limit of the degree of acetylation is more preferably 2 mol % and the lower limit thereof is preferably 0.1 mol %. The hydroxy group contents, degrees of acetalization, and degrees of acetylation of the polyvinyl acetal A, B, and Y can be measured by the same methods as those for the polyvinyl acetal X.

The lower limit of the amount of the plasticizer in the protective layer is preferably 20 parts by mass and the upper limit thereof is preferably 45 parts by mass, relative to 100 parts by mass of the polyvinyl acetal Y. When the amount of the plasticizer is 20 parts by mass or more, the penetration resistance can be ensured. When the amount of the plasticizer is 45 parts by mass or less, bleeding of the plasticizer can be prevented so that reduction in the transparency or adhesiveness of the interlayer film for a laminated glass can be prevented. The lower limit of the amount of the plasticizer is more preferably 30 parts by mass, still more preferably 35 parts by mass and the upper limit thereof is more preferably 43 parts by mass, still more preferably 41 parts by mass. For further enhancement of the sound insulation properties of the laminated glass, the amount of the plasticizer in the protective layer is preferably smaller than the amount of the plasticizer in the sound insulation layer.

For further enhancement of the sound insulation properties of the laminated glass, the hydroxy group content of the polyvinyl acetal Y is preferably higher than the hydroxy group content of the polyvinyl acetal X. The hydroxy group content of the polyvinyl acetal Y is higher than the hydroxy group content of the polyvinyl acetal X more preferably by 1 mol % or more, still more preferably by 5 mol % or more, particularly preferably by 8 mol % or more. Adjustment of the hydroxy group contents of the polyvinyl acetal X and the polyvinyl acetal Y enables control of the amounts of the plasticizer in the sound insulation layer and the protective layer, lowering the glass transition temperature of the sound insulation layer. As a result, the sound insulation properties of the laminated glass are further improved.

For further improvement of the sound insulation properties of the laminated glass, the amount of the plasticizer relative to 100 parts by mass of the polyvinyl acetal X in the sound insulation layer (hereafter, also referred to as amount X) is preferably larger than the amount of the plasticizer relative to 100 parts by mass of the polyvinyl acetal Y in the protective layer (hereafter, also referred to as amount Y). The amount X is larger than the amount Y more preferably by 5 parts by mass or more, still more preferably by 15 parts by mass or more, particularly preferably by 20 parts by mass or more. Adjustment of the amount X and the amount Y lowers the glass transition temperature of the sound insulation layer. As a result, the sound insulation properties of the laminated glass are further improved.

The protective layer preferably has an average thickness of 100 μm or more. When the protective layer has an average thickness of 100 μm or more, variation in average thickness of the sound insulation layer can be suppressed. The protective layer has an average thickness of more preferably 200 μm or more, still more preferably 250 μm or more. The upper limit of the average thickness of the protective layer is not particularly limited, and is practically around 1,000 μm.

The present invention also encompasses a colored laminated glass including a pair of glass plates and the interlayer film for a colored laminated glass of the present invention interposed between the pair of glass plates.

The glass plates may be commonly used transparent plate glass. Examples thereof include inorganic glass such as float plate glass, polished plate glass, molded plate glass, meshed glass, wire-reinforced plate glass, colored plate glass, heat-absorbing glass, heat-reflecting glass, and green glass. Also usable is UV light-shielding glass in which a UV light-shielding coat layer is formed on the surface of glass. Moreover, organic plastic plates such as polyethylene terephthalate, polycarbonate, or polyacrylate plates may also be used.

As the glass plates, two or more kinds of glass plates may be used. Exemplary cases thereof include a colored laminated glass in which the interlayer film for a colored laminated glass of the present invention is sandwiched between a transparent float plate glass and a colored glass plate such as green glass. Moreover, as the glass plates, two or more kinds of glass plates different in thickness may be used.

Advantageous Effects of Invention

The present invention can provide an interlayer film for a colored laminated glass which exhibits, when incorporated in a laminated glass together with two clear glass plates in conformity with JIS R3202 (1996), a visible light transmittance Tv of 5% or lower, small variation in visible light transmittance from portion to portion and an excellent appearance, and a colored laminated glass produced using the interlayer film for a colored laminated glass.

DESCRIPTION OF EMBODIMENTS

Figure 1:
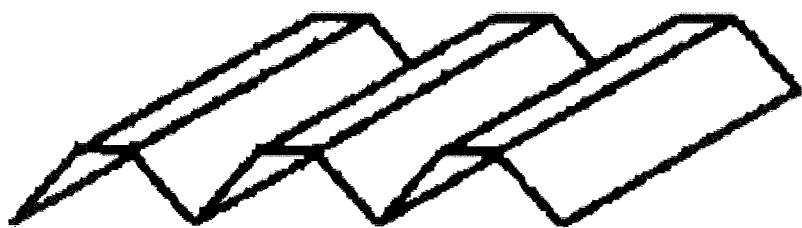
FIG. 1 is a schematic view illustrating an exemplary interlayer film for a laminated glass in which recesses each having a groove shape with a continuous bottom are arranged on a surface at equal intervals and adjacent recesses are arranged side by side in parallel to each other.
Figure 2:
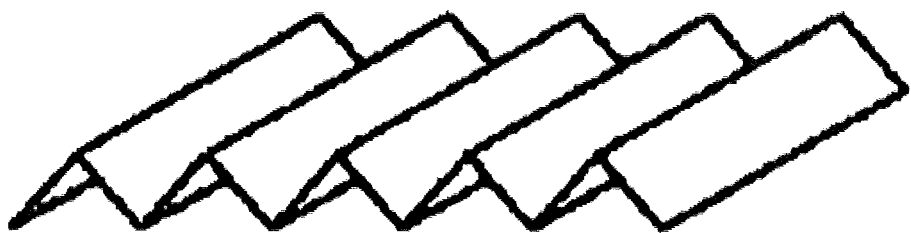
FIG. 2 is a schematic view illustrating an exemplary interlayer film for a laminated glass in which recesses each having a groove shape with a continuous bottom are arranged on a surface at equal intervals and adjacent recesses are arranged side by side in parallel to each other.
Figure 3:
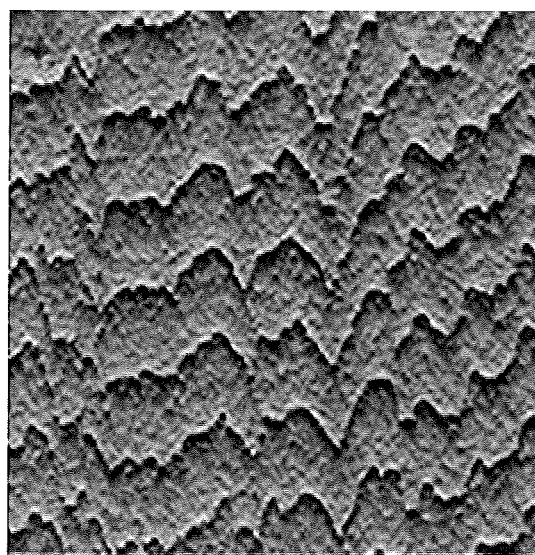
FIG. 3 is a 3D roughness image data obtained by the measurement using a 3D profilometer performed on a surface of an interlayer film for a laminated glass having recesses each having a groove shape with a continuous bottom on the surface.

Embodiments of the present invention are specifically described in the following with reference to, but not limited to, examples.

EXAMPLE 1

(1) Preparation of a Resin Composition for a First Resin Layer

Polyvinyl alcohol having an average degree of polymerization of 1,700 was acetalized using n-butyraldehyde to provide polyvinyl butyral having an acetyl group content of 1 mol %, a butyral group content of 69 mol %, and a hydroxy group content of 30 mol % (hereafter, also referred to as "PVB1"). To 100 parts by mass of the PVB1 were added 40 parts by mass of triethylene glycol-di-2-ethylhexanoate (3GO) as a plasticizer and carbon black as a colorant, and they were sufficiently kneaded using a mixing roll to prepare a resin composition for a first resin layer. The amount of the added colorant was set to 0.095% by mass in 100% by mass of the first resin layer and 0.038% by mass in 100% by mass of the entire interlayer film for a colored laminated glass to be obtained.

(2) Preparation of a Resin Composition for a Second Resin Layer

To 100 parts by mass of the PVB1 was added 40 parts by mass of triethylene glycol-di-2-ethylhexanoate (3GO) as a plasticizer, and they were sufficiently kneaded using a mixing roll to prepare a resin composition for a second resin layer.

(3) Production of an Interlayer Film for a Colored Laminated Glass

The obtained resin composition for a first resin layer and resin composition for a second resin layer were extruded from a co-extruder under the condition of an extrusion temperature of 200° C., thereby preparing an interlayer film for a colored laminated glass having a two-layer structure (first resin layer/second resin layer).

The thickness of each resin layer of the obtained interlayer film for a colored laminated glass was measured by the method described above. Table 1 shows the thickness of each resin layer.

(4) Production of a Colored Laminated Glass

The obtained interlayer film for a colored laminated glass was sandwiched between a pair of clear glass plates (5 cm in length×5 cm in width, 2.5 mm in thickness) in conformity with JIS R3202 (1996) to prepare a laminate. The obtained laminate was press-bonded under vacuum at 90° C. for 30 minutes using a vacuum laminator. The press-bonded laminate was further press-bonded for 20 minutes under 14 MPa at 140° C. using an autoclave. Thus, a colored laminated glass was obtained.

EXAMPLE 2

An interlayer film for a colored laminated glass having a three-layer structure (second resin layer/first resin layer/second resin layer) was produced in which the thickness of each resin layer was adjusted to the value as shown in Table 1 using the resin composition for a first resin layer and the resin composition for a second resin layer obtained in Example 1. The interlayer film for a laminated glass was produced as in Example 1.

COMPARATIVE EXAMPLE 1

In the preparation of a resin composition for a first resin layer, the amount of the added colorant was changed to 0.245% by mass in 100% by mass of the resulting first resin layer and 0.037% by mass in 100% by mass of the entire interlayer film for a colored laminated glass to be obtained. Using this resin composition for a first resin layer, an interlayer film for a colored laminated glass having a three-layer structure in which the thickness of each resin layer was adjusted to the value as shown in Table 2 was produced as in Example 2.

COMPARATIVE EXAMPLE 2

In the preparation of a resin composition for a first resin layer, the amount of the added colorant was changed to 0.160% by mass in 100% by mass of the resulting first resin layer and 0.038% by mass in 100% by mass of the entire interlayer film for a colored laminated glass to be obtained. Using this resin composition for a first resin layer, an interlayer film for a colored laminated glass having a three-layer structure in which the thickness of each resin layer was adjusted to the value as shown in Table 2 was produced as in Example 2.

EXAMPLE 3

(1) Preparation of a Resin Composition for a First Resin Layer

To 100 parts by mass of PVB1 were added 42 parts by mass of 3GO as a plasticizer and carbon black as a colorant, and they were sufficiently kneaded using a mixing roll to prepare a resin composition for a first resin layer. The amount of the added carbon black was set to 0.171% by mass in 100% by mass of the first resin layer and 0.058% by mass in 100% by mass of the resulting colored interlayer film.

(2) Preparation of a Resin Composition for a Second Resin Layer

To 100 parts by mass of PVB1 was added 38.5 parts by mass of 3GO as a plasticizer, and they were sufficiently kneaded using a mixing roll to prepare a resin composition for a second resin layer.

(3) Production of an Interlayer Film for a Colored Laminated Glass

The obtained resin compositions for a first resin layer and for a second resin layer were extruded from a co-extruder under the condition of an extrusion temperature of 200° C., thereby preparing a laminate having a three-layer structure (second resin layer/first resin layer/second resin layer).

(4) Formation of Recesses

A pair of embossing rolls having a large number of fine recesses and a large number of fine protrusions formed thereon was used as a device for transferring fine protrusions and recesses. The obtained laminate was passed through the embossing rolls. Thus, a laminate having a large number of fine recesses and a large number of fine protrusions formed thereon was prepared.

Another pair of embossing rolls was further used as a device for transferring protrusions and recesses. The obtained laminate having a large number of fine recesses and a large number of fine protrusions formed thereon was passed through the embossing rolls, and to the both surfaces of the laminate were formed recesses having a surface roughness (Rz) of 31 μm in which recesses each having a groove shape with a continuous bottom (shape of an engraved line) were formed in parallel to each other at equal intervals. Thus, an interlayer film for a colored laminated glass was obtained. The pairs of embossing rolls each include a metal roll having a surface milled with a triangular oblique line-type mill and a rubber roll having a JIS hardness of 45 to 75.

The surface roughness Rz was measured by a method in conformity with JIS B-0601 (1994). The transferring conditions for formation of the recesses each having a groove shape (shape of an engraved line) were a temperature of a laminate of 95° C., a roll temperature of 130° C., and a press pressure of 500 kPa.

The thickness of each resin layer of the obtained interlayer film for a colored laminated glass was measured by the method described above. Table 1 shows the thickness of each resin layer.

(5) Production of a Colored Laminated Glass

The obtained interlayer film for a colored laminated glass was sandwiched between a pair of clear glass plates (5 cm in length×5 cm in width, 2.5 mm in thickness) in conformity with JIS R3202 (1996) to prepare a laminate. The obtained laminate was press-bonded under vacuum at 90° C. for 30 minutes using a vacuum laminator. The press-bonded laminate was further press-bonded for 20 minutes under 14 MPa at 140° C. using an autoclave. Thus, a colored laminated glass was obtained.

EXAMPLES 4 TO 7, COMPARATIVE EXAMPLES 3 TO 6

An interlayer film for a colored laminated glass and a colored laminated glass were obtained as in Example 3, except that the amount of the plasticizer, the concentration of the colorant, and the thickness of each resin layer were changed as shown in Table 1 or 2.

EXAMPLE 8, COMPARATIVE EXAMPLE 7

An interlayer film for a colored laminated glass and a colored laminated glass were obtained as in Example 3, except that the resin used for the first resin layer was changed from PVB1 to polyvinyl butyral 2 (hereafter, also referred to as "PVB2") and the amount of the plasticizer, the concentration of the colorant, and the thickness of each resin layer were changed as shown in Table 1 or 2.

PVB2 was obtained by acetalizing polyvinyl alcohol having an average degree of polymerization of 2,300 with n-butyraldehyde, and had an acetyl group content of 12 mol %, a butyral group content of 66 mol %, and a hydroxy group content of 22 mol %.

(Evaluation)

The interlayer films for a laminated glass obtained in the examples and comparative examples were evaluated by the following method. Tables 1 and 2 show the results.

(Measurement of Visible Light Transmittance)

The visible light transmittance within a wavelength range of 380 to 780 nm was measured at an arbitrarily selected 20 sites on the obtained laminated glass using a spectrophotometer ("U-4100" available from Hitachi High-Technologies Corporation) in conformity with JIS R 3106 (1998). The average and the standard deviation of the visible light transmittances measured at 20 sites were obtained. The obtained standard deviation was divided by the average of the visible light transmittances, and the quotient was centupled. The obtained value (standard deviation/average of visible light transmittance×100) was defined as a CV value. The visible light transmittance of the clear glass plates used in the examples and comparative examples was 90.5%.

TABLE 1

| | | | | Example 1 | Example 2 | Example 3 | Example 4 | Example 5 | Example 6 | Example 7 | Example 8 |
|---|---|---|---|---|---|---|---|---|---|---|---|
| Resin composition | First resin layer | Resin | Kind | PVB1 | PVB1 | PVB1 | PVB1 | PVB1 | PVB1 | PVB1 | PVB2 |
| | | | Parts by mass | 100 | 100 | 100 | 100 | 100 | 100 | 100 | 100 |
| | | Plasticizer | Kind | 3GO | 3GO | 3GO | 3GO | 3GO | 3GO | 3GO | 3GO |
| | | | Parts by mass | 40 | 40 | 42 | 42 | 42 | 40 | 38.5 | 60 |
| | | Colorant | Kind | Carbon black | Carbon black | Carbon black | Carbon black | Carbon black | Carbon black | Carbon black | Carbon black |
| | | | % by mass | 0.095 | 0.095 | 0.171 | 0.193 | 0.150 | 0.171 | 0.085 | 0.289 |
| | Second resin layer | Resin | Kind | PVB1 | PVB1 | PVB1 | PVB1 | PVB1 | PVB1 | PVB1 | PVB1 |
| | | | Parts by mass | 100 | 100 | 100 | 100 | 100 | 100 | 100 | 100 |
| | | Plasticizer | Kind | 3GO | 3GO | 3GO | 3GO | 3GO | 3GO | 3GO | 3GO |
| | | | Parts by mass | 40 | 40 | 38.5 | 38.5 | 38.5 | 40 | 42 | 38 |
| Interlayer film for colored laminated glass | Second resin layer | $t_{2max}$ | μm | 500 | 260 | 175 | 186 | 170 | 174 | 115 | 347 |
| | | $t_{2min}$ | μm | 400 | 220 | 150 | 158 | 147 | 150 | 89 | 320 |
| | | $\Delta t_2$ | μm | 100 | 40 | 25 | 28 | 23 | 24 | 26 | 27 |
| | | Average thickness | μm | 455 | 235 | 165 | 170 | 160 | 165 | 100 | 330 |
| | First resin layer | $t_{1max}$ | μm | 345 | 335 | 181 | 163 | 186 | 186 | 314 | 109 |
| | | $t_{1min}$ | μm | 270 | 270 | 160 | 135 | 165 | 155 | 286 | 91 |
| | | $\Delta t_1$ | μm | 75 | 65 | 21 | 28 | 21 | 31 | 28 | 18 |
| | | Average thickness | μm | 305 | 300 | 170 | 150 | 170 | 170 | 300 | 100 |
| | Second resin layer | $t_{2max}$ | μm | — | 255 | 174 | 196 | 183 | 176 | 109 | 345 |
| | | $t_{2min}$ | μm | — | 210 | 151 | 169 | 158 | 153 | 89 | 319 |
| | | $\Delta t_2$ | μm | — | 45 | 23 | 27 | 25 | 23 | 20 | 26 |
| | | Average thickness | μm | — | 225 | 165 | 180 | 170 | 165 | 100 | 330 |
| | Entire interlayer film | Colorant | % by mass | 0.038 | 0.038 | 0.058 | 0.058 | 0.051 | 0.058 | 0.051 | 0.038 |
| | | $\Delta t_1/t_1$ average | | 0.25 | 0.22 | 0.12 | 0.19 | 0.12 | 0.18 | 0.09 | 0.18 |
| Evaluation | | Average (%) of visible light transmittance Tv | | 1.52 | 1.49 | 1.52 | 1.6 | 4.86 | 1.56 | 4.9 | 1.59 |
| | | CV value (%) of visible light transmittance Tv | | 25.8 | 24.6 | 18.5 | 20.6 | 7.9 | 13.1 | 8 | 20.6 |

TABLE 2

| | | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Resin composition | First resin layer | Resin | Kind | PVB1 | PVB1 | PVB1 | PVB1 | PVB1 | PVB1 | PVB2 |
| | | | Parts by mass | 100 | 100 | 100 | 100 | 100 | 100 | 100 |
| | | Plasticizer | Kind | 3GO | 3GO | 3GO | 3GO | 3GO | 3GO | 3GO |
| | | | Parts by mass | 40 | 40 | 42 | 42 | 42 | 40 | 60 |
| | | Colorant | Kind | Carbon black | Carbon black | Carbon black | Carbon black | Carbon black | Carbon black | Carbon black |
| | | | % by mass | 0.245 | 0.160 | 0.171 | 0.193 | 0.150 | 0.171 | 0.289 |
| | Second resin layer | Resin | Kind | PVB1 | PVB1 | PVB1 | PVB1 | PVB1 | PVB1 | PVB1 |
| | | | Parts by mass | 100 | 100 | 100 | 100 | 100 | 100 | 100 |
| | | Plasticizer | Kind | 3GO | 3GO | 3GO | 3GO | 3GO | 3GO | 3GO |
| | | | Parts by mass | 40 | 40 | 38.5 | 38.5 | 38.5 | 40 | 38 |
| Interlayer film for colored laminated glass | Second resin layer | $t_{2max}$ | μm | 355 | 335 | 181 | 191 | 176 | 179 | 356 |
| | | $t_{2min}$ | μm | 300 | 280 | 143 | 152 | 142 | 146 | 313 |
| | | $\Delta t_2$ | μm | 55 | 55 | 38 | 39 | 34 | 33 | 43 |
| | | Average thickness | μm | 325 | 300 | 165 | 170 | 160 | 165 | 330 |
| | First | $t_{1max}$ | μm | 150 | 220 | 201 | 173 | 203 | 198 | 119 |

TABLE 2-continued

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| | resin layer | $t_{1min}$ μm | 85 | 150 | 148 | 124 | 149 | 142 | 87 |
| | | $\Delta t_1$ μm | 65 | 70 | 53 | 49 | 54 | 56 | 32 |
| | | Average thickness μm | 115 | 180 | 170 | 150 | 170 | 170 | 100 |
| | Second resin layer | $t_{2max}$ μm | 345 | 310 | 183 | 205 | 193 | 181 | 356 |
| | | $t_{2min}$ μm | 300 | 270 | 147 | 169 | 150 | 141 | 315 |
| | | $\Delta t_2$ μm | 45 | 40 | 36 | 36 | 43 | 40 | 41 |
| | | Average thickness μm | 320 | 290 | 165 | 180 | 170 | 165 | 330 |
| | Entire interlayer film | Colorant % by mass | 0.037 | 0.038 | 0.058 | 0.058 | 0.051 | 0.058 | 0.038 |
| Evaluation | | $\Delta t_1/t_1$ average | 0.57 | 0.39 | 0.31 | 0.33 | 0.32 | 0.33 | 0.32 |
| | | Average (%) of visible light transmittance Tv | 2.35 | 2.12 | 1.63 | 1.53 | 4.78 | 1.65 | 1.55 |
| | | CV value (%) of visible light transmittance Tv | 44.6 | 37.3 | 34 | 29 | 12 | 36 | 34.5 |

INDUSTRIAL APPLICABILITY

The present invention can provide an interlayer film for a colored laminated glass which exhibits, when incorporated in a laminated glass together with two clear glass plates in conformity with JIS R3202 (1996), an excellent-appearance laminated glass having a visible light transmittance Tv of 5% or lower, small variation in visible light transmittance from portion to portion and an excellent appearance, and a colored laminated glass produced using the interlayer film for a colored laminated glass.

The invention claimed is:

1. An interlayer film for a colored laminated glass exhibiting a visible light transmittance Tv of 5% or lower when incorporated in a laminated glass together with two clear glass plates in conformity with JIS R3202 (1996),
the interlayer film for a colored laminated glass comprising a laminate of at least two layers including a first resin layer containing a thermoplastic resin and a colorant and a second resin layer containing a thermoplastic resin and no colorant,
the first resin layer satisfying a ratio of a difference $\Delta t_1$ in thickness between the maximum value $t_{1max}$ and the minimum value $t_{1min}$ to an average thickness ($\Delta t_1$ of first resin layer/average thickness of first resin layer) of 0.30 or less,
wherein the interlayer film has recesses on at least one surface thereof, and
wherein a CV value of visible light transmittance (%) obtained by a following equation is 24.6% or less:

CV value=standard deviation/average of visible light transmittance×100.

2. The interlayer film for a colored laminated glass according to claim 1, comprising a laminate of at least three layers including a first resin layer interposed between two second resin layers.

3. The interlayer film for a colored laminated glass according to claim 1,
wherein the first resin layer has an average thickness of 100 to 500 μm and the second resin layer has an average thickness of 100 μm or more.

4. A colored laminated glass comprising:
a pair of glass plates; and
the interlayer film for a colored laminated glass according to claim 1 interposed between the pair of glass plates.

5. The interlayer film for a colored laminated glass according to claim 2,
wherein the first resin layer has an average thickness of 100 to 500 μm and the second resin layer has an average thickness of 100 μm or more.

6. A colored laminated glass comprising:
a pair of glass plates; and
the interlayer film for a colored laminated glass according to claim 2 interposed between the pair of glass plates.

7. A colored laminated glass comprising:
a pair of glass plates; and
the interlayer film for a colored laminated glass according to claim 3 interposed between the pair of glass plates.

8. A colored laminated glass comprising:
a pair of glass plates; and
the interlayer film for a colored laminated glass according to claim 5 interposed between the pair of glass plates.

* * * * *